(12) United States Patent
Bouchard et al.

(10) Patent No.: US 7,837,419 B2
(45) Date of Patent: Nov. 23, 2010

(54) METHODS INVOLVING MARKING MOLDS

(75) Inventors: Eric Bouchard, Granby (CA); Luc Guerin, Granby (CA); Robert G Haas, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 11/939,604

(22) Filed: Nov. 14, 2007

(65) Prior Publication Data
US 2009/0123589 A1    May 14, 2009

(51) Int. Cl.
B23C 3/00 (2006.01)
B43L 13/00 (2006.01)

(52) U.S. Cl. .................................... 409/132; 33/18.2
(58) Field of Classification Search ......... 409/131–132; 33/18.2–18.1; 483/9
See application file for complete search history.

(56) References Cited

U.S. PATENT DOCUMENTS 2,902,761  A  * 9/1959  Koenig .................. 30/164.9
2,963,961  A  * 12/1960 Sundstrom .................. 101/4
6,024,448  A  * 2/2000  Wu et al. ................ 351/160 R
6,400,037  B1 * 6/2002  Omizo ..................... 257/797
6,568,593  B2 * 5/2003  Hetzer ..................... 235/385
6,680,220  B2 * 1/2004  Minamio et al. ............ 438/110
7,191,529  B2 * 3/2007  Phipps et al. .............. 33/18.1
2002/0014661 A1 * 2/2002  Okamoto et al. ............ 257/347
2005/0086816 A1   4/2005  Siegel
2007/0033816 A1 * 2/2007  Zeng et al. ................ 33/18.1
2008/0101034 A1 * 5/2008  Loon ...................... 361/719

* cited by examiner

Primary Examiner—Erica E Cadugan
(74) Attorney, Agent, or Firm—Cantor Colburn LLP; Joseph Petrokaitis

(57) ABSTRACT

An exemplary method for marking molds, the method comprising, configuring a milling machine to operate with a diamond coated bit having an angle of approximately 60 degrees, and engraving a unique identifier on a bottom surface of a borosilicate glass injection molded soldering mold with the milling machine.

12 Claims, 3 Drawing Sheets

METHODS INVOLVING MARKING MOLDS

BACKGROUND OF THE INVENTION

1. Field of the Invention

This invention relates generally to a method for marking molds used in high temperature manufacturing.

2. Description of Background

Glass molds used in high temperature manufacturing processes such as Injection Molded Soldering (IMS) are exposed to high temperatures while producing semiconductors. It is desirable that the molds be marked with identifiers that may be subjected to high heat.

SUMMARY OF THE INVENTION

The shortcomings of the prior art are overcome and additional advantages are achieved through an exemplary method for marking molds, the method including, configuring a milling machine to operate with a diamond coated bit having an angle of approximately 60 degrees, and engraving a unique identifier on a bottom surface of a borosilicate glass injection molded soldering mold with the milling machine.

An alternate exemplary method for marking molds, the method including, configuring a milling machine to operate with a diamond coated conical bit having an angle of between approximately 45 degrees and 90 degrees, and engraving a unique identifier on a bottom surface of an injection molded soldering mold with the milling machine.

An exemplary injection molded soldering mold, comprising, a borosilicate glass member, an identifier marked on the borosilicate glass member by engraving the borosilicate glass member with a milling machine configured to operate with a diamond coated bit having an angle of approximately 60 degrees.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Methods involving marking molds used in the production of silicon wafers are provided.

In this regard, injection mold soldering (IMS) is a process that uses a mold having a pattern that is filled with solder to "bump" the patterned solder onto a wafer. Controlled Collapse Chip Connection New Process (C4NP) is an IMS process that uses molds made from borosilicate glass having a coefficient of thermal expansion (CTE) matched to silicon.

Figure 2:
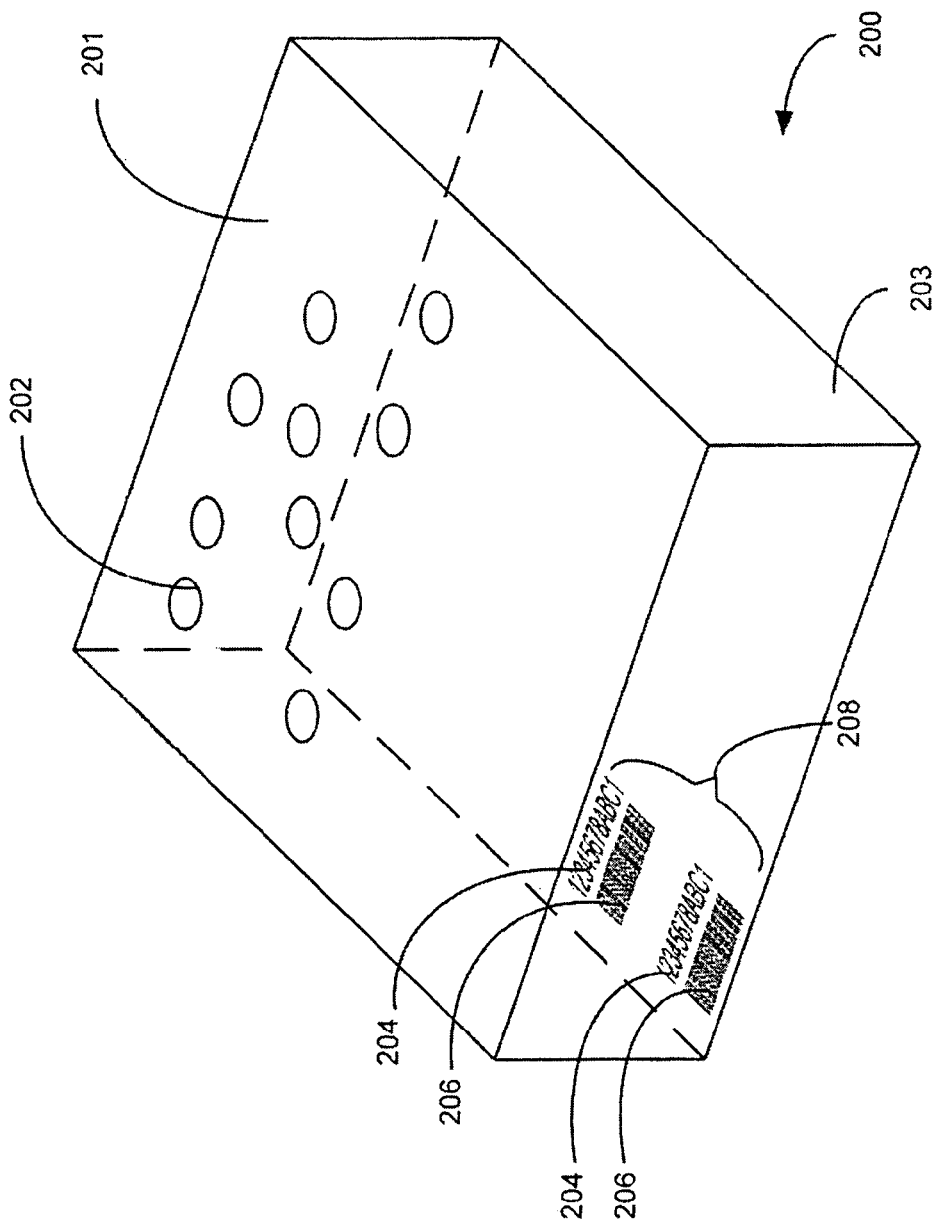
FIG. 2 illustrates an example of a marked mold.

FIG. 2 illustrates an example of a C4NP glass mold 200. The mold 200 has a desired solder pattern 202 on a top surface 201. During the C4NP process, solder is injected onto the top surface 201 of the mold 200 and fills the solder pattern 202. The mold 200 is then placed on a heating element (not shown) with the top surface 201 up. The mold 200 is heated to a temperature of over 300 degrees C. and a silicon wafer (not shown) is pressed against the top surface. The solder that is in the solder pattern 202 is transferred to the wafer. The mold 200 may then be cleaned and reused. To ensure that the mold may be reused, the physical properties and dimensions of the mold should not be substantially altered by a marking method.

Often, production facilities may use a number of different molds. The molds may have different patterns, or may be the same pattern. Each of the molds should be readily identifiable. The molds may have a unique identifier that identifies the type of mold, and a serial number that identifies the individual mold. An example of a standard system for marking semiconductor wafers may be found in Semiconductor Equipment and Materials International (SEMI) publication SEMI M12-1103, "Specification for serial alphanumeric marking of the front of surface wafers."

The illustrated embodiment shows an example of markings 208 comprising unique identifiers engraved in the mold 200. An alphanumeric identifier 204 is a human readable code. A machine-readable identifier 206 is a machine readable bar code. In some embodiments, the alphanumeric identifier 204 may be human readable and may also be read by a machine. If the alphanumeric identifier is both human and machine readable, the machine-readable identifier 206 may not be used. The markings 208 include a copy of the alphanumeric identifier 204 and the machine-readable identifier 206 in an example of an alternate location.

Since the mold 200 has a solder pattern 202 on the top surface 201, marking methods that remove material from the top surface of the mold 200 generally may not be used. Since the bottom surface 203 of the mold 200 is in contact with a heating element during the C4NP heating process, adding material to the bottom surface 203 of the mold may result in the mold 200 not contacting the heating element uniformly. Thus, engraving the bottom surface 203 of the plate allows the mold 200 to contact the heating element uniformly and does not interfere with the transfer of solder from the mold 200 to the wafer.

To make the markings 208 readable when looking through the top surface 201 of the mold 200, the markings 208 may be engraved as a mirror image on the bottom surface 203 of the mold 200.

Figure 1:
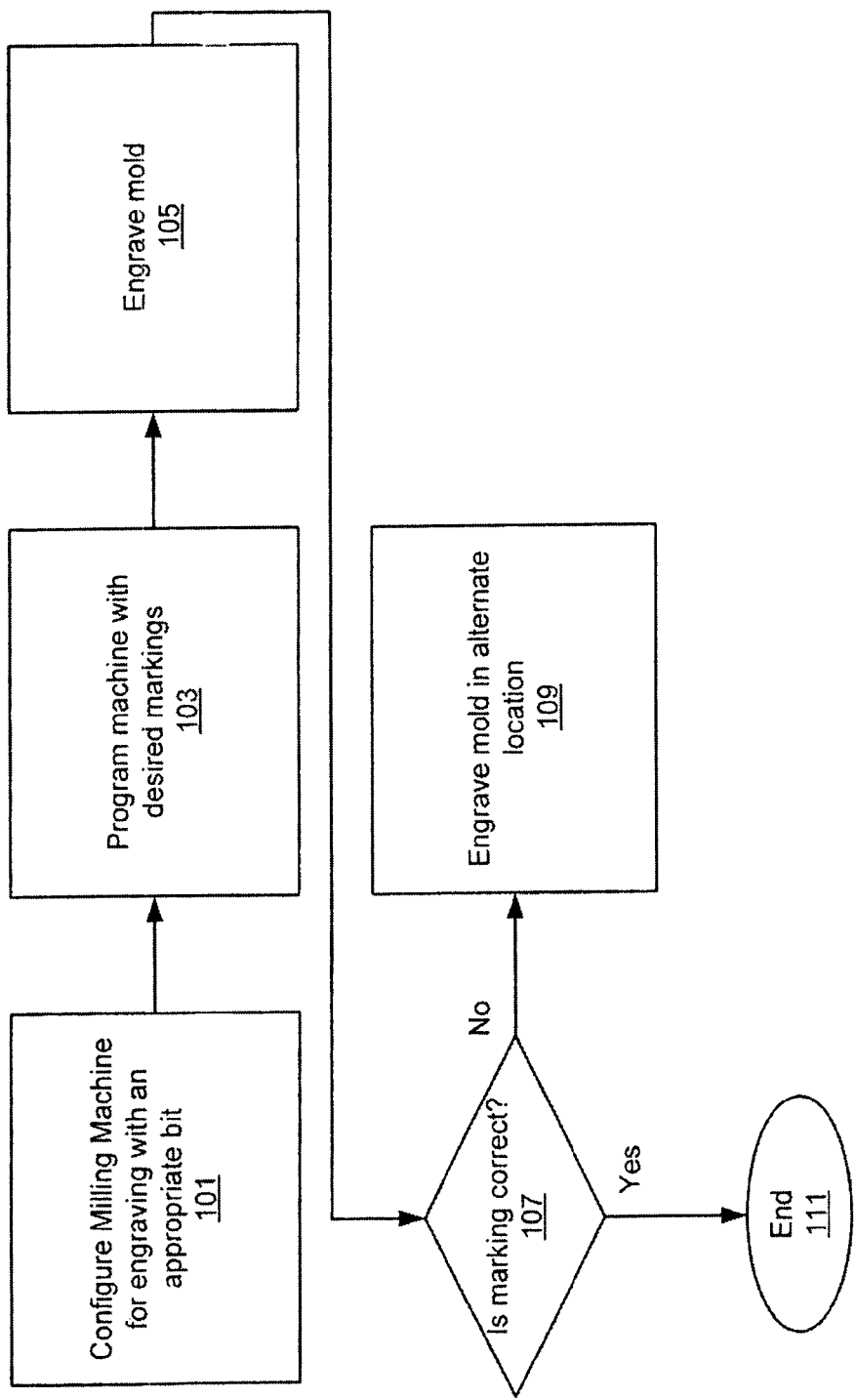
FIG. 1 illustrates an exemplary method for engraving molds.

To produce the markings 208, a computer numerical control (CNC) milling machine, or another suitable engraving machine may be used. FIG. 1 illustrates an exemplary embodiment of a method for marking a mold. In block 101, a CNC machine is configured for engraving unique identifiers of the mold. The CNC machine is programmed with the desired markings in block 103, and the mold is engraved in block 105. The marking is checked to ensure it is correct in block 107. If the marking is correct, the method ends in block 111. In block 109, if the marking is not correct the marking may be engraved again in an alternate location.

It has been found through experimentation that a diamond coated bit is preferable because diamond coated bits are hard enough to mark the glass of the mold. Other bits with a hardness that may effectively mark the glass of the mold may also be used.

A conical bit having an angle of approximately 60 degrees is desirable because when a cutting depth of approximately 40 to 200 microns is used, the characters marked have a line width of approximately 50 to 250 microns. Though larger angled conical bits have a greater durability, if the cutting depth varies with a larger angled bit, the line width of the characters varies at a higher rate. However, conical bits with a cutting angle of approximately 45 to 90 degrees may be used. A rotation of approximately 50,000 revolutions per minute (RPM) is desirable to minimize chipping of the mold material. The bit may also be cooled using a liquid coolant such as, for example Isopropyl Alcohol and an inert gas.

Figure 3:
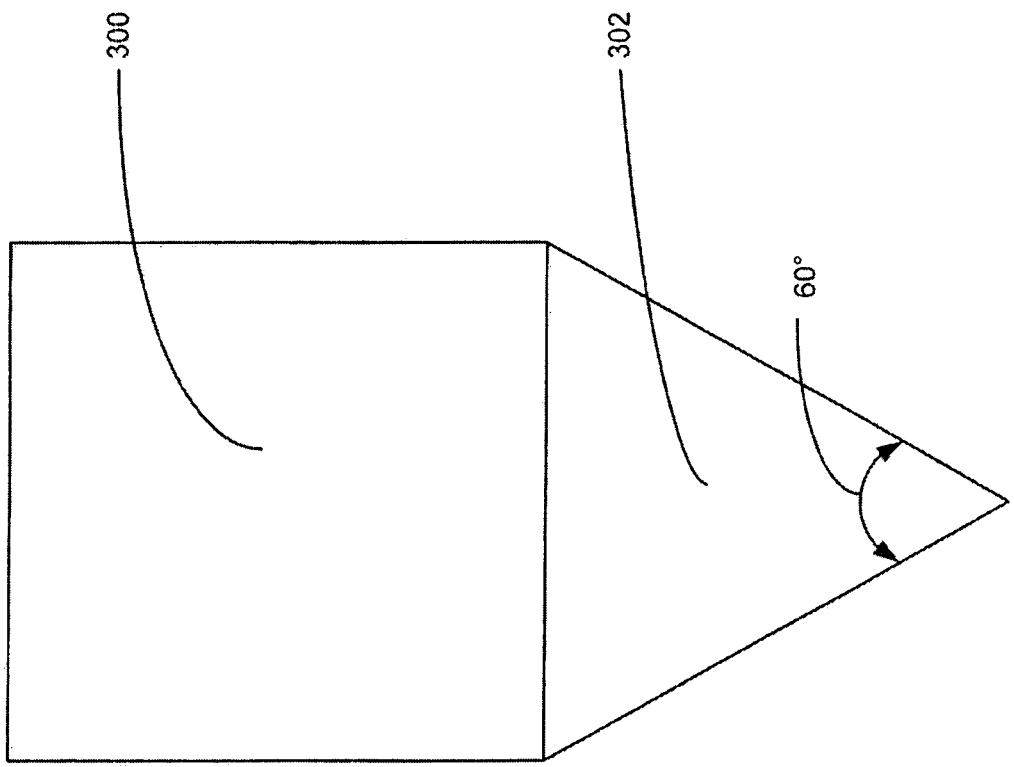
FIG. 3 illustrates a cut-away view of an example of a bit used in the method of FIG. 1.

FIG. 3 illustrates a cut-away view of an example of a conical bit 300 having a tip 302. The angle of the tip is 60 degrees as indicated. Using the above-described methods, stress is not induced in the borosilicate mold 200 during marking. Thus, the marked mold is not damaged when the mold is subsequently used in a molding process that exposes the mold to over 300° C.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for marking molds having a top molding surface and a bottom surface opposite the top surface, the method comprising:
   configuring a milling machine to operate with a diamond coated bit having a shape that forms an angle of approximately 60 degrees; and
   engraving a unique identifier on the bottom surface of a borosilicate glass injection molded soldering mold with the milling machine.

2. The method of claim 1, wherein an engraving depth is between 40 and 200 microns.

3. The method of claim 1, the method further comprising cooling the bit with Isopropyl Alcohol.

4. The method of claim 1, the method further comprising cooling the bit with an inert gas.

5. The method of claim 1, wherein the bit is rotated at approximately 50,000 revolutions per minute.

6. The method of claim 1, the method further comprising:
   determining whether the engraved unique identifier is incorrect;
   engraving the unique identifier in an alternate location on the bottom surface of the mold, responsive to determining that the engraved unique identifier is incorrect.

7. A method for marking molds having a top molding surface and a bottom surface opposite the top surface, the method comprising:
   configuring a milling machine to operate with a diamond coated conical bit having a shape that forms an angle of between approximately 45 degrees and 90 degrees; and
   engraving a unique identifier on the bottom surface of an injection molded soldering mold with the milling machine.

8. The method of claim 7, wherein an engraving depth is between 40 and 200 microns.

9. The method of claim 7, the method further comprising cooling the conical bit with Isopropyl Alcohol.

10. The method of claim 7, the method further comprising cooling the conical bit with an inert gas.

11. The method of claim 7, wherein the conical bit is rotated at approximately 50,000 revolutions per minute.

12. The method of claim 7, the method further comprising:
    determining whether the engraved unique identifier is incorrect;
    engraving the unique identifier in an alternate location on the bottom surface of the mold, responsive to determining that the engraved unique identifier is incorrect.

* * * * *